United States Patent
Takaoka et al.

(10) Patent No.: US 6,839,222 B2
(45) Date of Patent: Jan. 4, 2005

(54) ELECTROLYTIC CAPACITOR

(75) Inventors: Ryoko Takaoka, Osaka (JP);
Kazumitsu Honda, Osaka (JP);
Yuichiro Tsubaki, Kyoto (JP);
Yoshihiro Watanabe, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/727,653

(22) Filed: Dec. 5, 2003

(65) Prior Publication Data

US 2004/0141281 A1 Jul. 22, 2004

(30) Foreign Application Priority Data

Dec. 6, 2002 (JP) ...................................... 2002-355143

(51) Int. Cl.⁷ ................................................ H01G 9/02
(52) U.S. Cl. ........................ 361/512; 361/504; 361/530
(58) Field of Search .................. 361/502, 503, 361/504, 512, 530, 523, 525

(56) References Cited

U.S. PATENT DOCUMENTS 5,204,428 A * 4/1993 Kobayashi et al. ......... 526/298
6,765,785 B2 * 7/2004 Honda et al. ............... 361/525

FOREIGN PATENT DOCUMENTS

JP        9-82580        3/1997
JP      10-223481        8/1998

* cited by examiner

*Primary Examiner*—Anthony Dinkins
(74) *Attorney, Agent, or Firm*—Wenderoth, Lind & Ponack, L.L.P.

(57) ABSTRACT

An electrolytic capacitor including a positive foil, a negative foil and an intervening separator which contains a polymeric electrolyte composite. The polymeric electrolyte composite contains electrolyte in the matrix of copolymeric acrylic ester. The separator contains at least either one of rayon fiber and cotton linter. Or, other separator takes the form of several overlaid sheets, each of the sheet being made of a cellulose fiber. The above-configured electrolytic capacitors have the advantages of high withstanding voltage, high heat resisting property and long life.

16 Claims, 3 Drawing Sheets

ELECTROLYTIC CAPACITOR

TECHNICAL FIELD

The present invention relates to an electrolytic capacitor, the electrolyte of the capacitor is an ionic conductive solid electrolyte including polymer.

BACKGROUND ART

FIG. 3 shows a partially sectional perspective view of a conventional electrolytic capacitor. Capacitor element 29 is formed by positive foil 21 and negative foil 22, wound together with intervening separator 23. Positive foil 21 is an aluminum foil, the effective surface area of foil 21 has been enlarged through etching process, and a dielectric oxide film formed through a chemical process is provided on the surface. Negative foil 22 is also made of an etched aluminum foil. Positive foil 21 and negative foil 22 are connected, respectively, with positive lead 25 and negative lead 26. Capacitor element 29 is impregnated with electrolyte 24 for driving. Capacitor element 29 is inserted in metal case 28 of aluminum, etc., and case 28 is sealed with sealing plate 27 made of rubber or the like material to complete a finished electrolytic capacitor.

An ionic conductive liquid is used for electrolyte 24; for example, an organic solvent of ethylene glycol, γ-butyrolactone, etc., in which boric acid, ammonium borate, etc. is resolved as solute. The content of water in electrolyte 24 is reduced, when solute of azelaic acid, 1,6-decane dicarboxylic acid, 5,6-decane dicarboxylic acid, dioic acids having a side chain or nonaqueous salts of the acids are used. Using such solute, the unclosing of electrolytic capacitors due to an increased inner pressure caused by the water content in the environment hotter than 100° C. can be curtailed.

There are other electrolytic capacitors which use an electronic conductive solid electrolyte in place of liquid electrolyte 24. Polypyrrole, polythiophene, polyaniline, etc. are used as the electrolyte. These electrolytes offer the advantages of lower equivalent serial resistance (hereinafter referred to as ESR). Thus it implements an electrolytic capacitor having a low ESR and a superior impedance characteristic.

There is still other proposal of using an ionic conductive solid electrolyte; the electrolyte is divided into the inorganic and the polymeric. The inorganic electrolyte has the advantage of high ionic conductivity; however, it is heavy, inflexible and less plastic. On the other hand, the polymeric electrolyte is attracting the attentions because it is light in weight and has superior mechanical properties such as flexibility, plasticity, etc.; despite its disadvantage in the lower ionic conductivity as compared to the inorganic electrolyte.

In the electrolytic capacitors using the ionic conductive polymer electrolyte, gelled electrolyte layer is formed between a positive foil having dielectric oxide film and a negative foil. Japanese Patent Unexamined Publication No. H09-082580 discloses an electrolytic capacitor using the gelled electrolyte of the following ingredients:

(a) a thermoplastic elastomer selected from among the polyamide-polyether block polymer and polyester-polyether block polymer, (b) a polar organic solvent, and (c) a solute.

According to Japanese Patent Unexamined Publication No. H10-223481, a positive foil and a negative foil provided at the surface with pits having the diameters larger than 0.1 μm are wound together with an intervening separator containing polyvinyl alcohol, for forming a capacitor element. The capacitor element is put into contact with a liquid electrolyte containing ethylene glycol for electrolytic capacitor, and the liquid electrolyte is gelled.

Electrolytic capacitors for use in nowadays countermeasure circuits against higher harmonics and in vehicles are requested to have a higher withstanding voltage, a higher heat resisting property, a longer life and a higher reliability in the anti-vibration capability, as compared to conventional electrolytic capacitors. The conventional liquid electrolytes using ionic conductive liquid can not satisfy the requirements in terms of the higher withstanding voltage ratio (improved spark voltage), the higher heat resisting temperature and the longer life.

The ionic conductive polymeric electrolyte has a high withstanding voltage, but the ionic conductivity is low as compared with the liquid electrolyte. As the result, resistance of electrolyte itself is high, which leads to a greater resistance loss as a capacitor. Therefore, it is important to reduce the resistance of the separator. Manila papers, kraft papers, esparto papers, etc., which are the materials generally used for the separator in aluminum electrolytic capacitors, have a high density. If, a lower density version of these materials is used for the purpose of lowering the resistance, the anti-short circuiting capability and the tensile strength are not enough.

SUMMARY OF THE INVENTION

An electrolytic capacitor in the present invention includes a positive foil provided at the surface with a dielectric film, a negative foil, and a separator therebetween containing polymeric electrolyte composite. The polymeric electrolyte composite contains an electrolyte in the matrix of acrylic ester copolymer. The electrolyte is consisting of a polar solvent, and a solute containing neither metal ion nor quaternary ammonium ion as a cation. The acrylic ester copolymer is a polymer of first monomer and second monomer. The first monomer is an acrylic derivative of at least one among the group of monofunctional monomers having hydroxyl group at the end and one polymeric unsaturated double bond. The second monomer is an acrylic derivative of at least one among the group of multifunctional monomers having a plurality of polymeric unsaturated double bonds. The separator includes at least either one among the rayon fiber and the cotton linter. Or, the separator is formed of a plurality of cellulose fiber sheets overlaid.

DESCRIPTION OF PREFERRED EMBODIMENT

Figure 1:
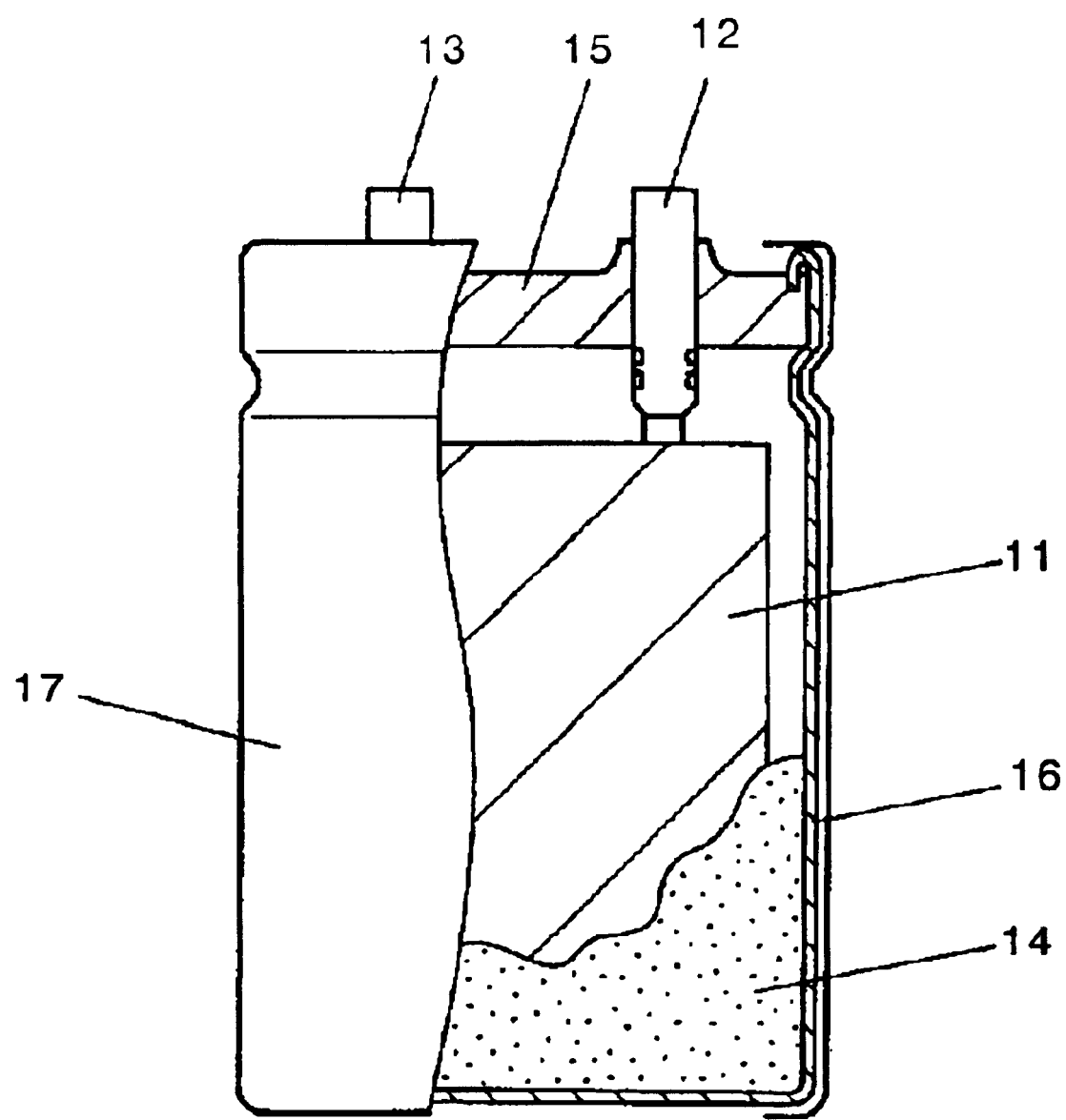
FIG. 1 shows the front elevation, partially cut-off, of an electrolytic capacitor in accordance with an exemplary embodiment of the present invention.
Figure 2:
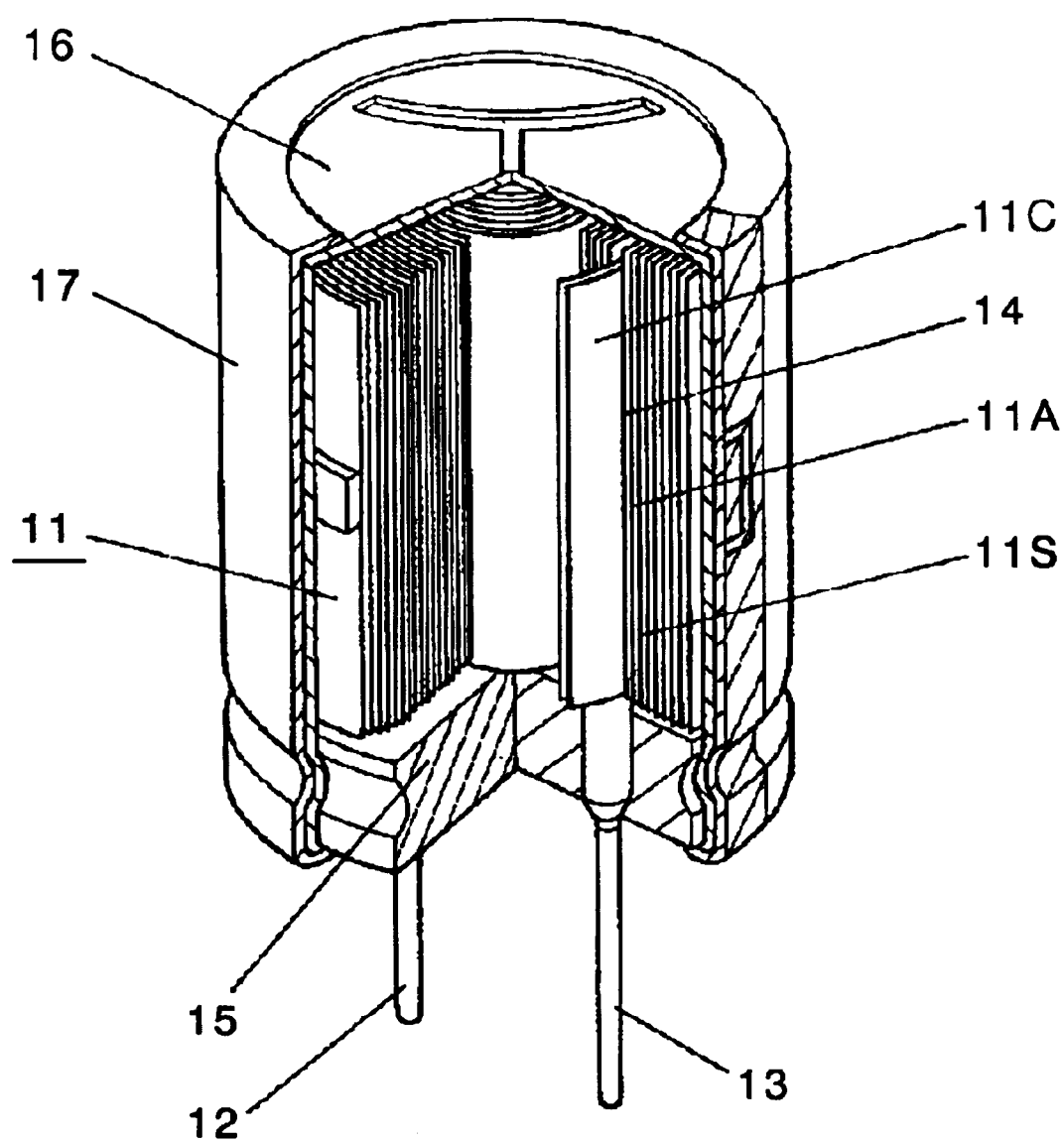
FIG. 2 is a partially-sectional perspective view showing the structure of the electrolytic capacitor shown in FIG. 1.
Figure 3:
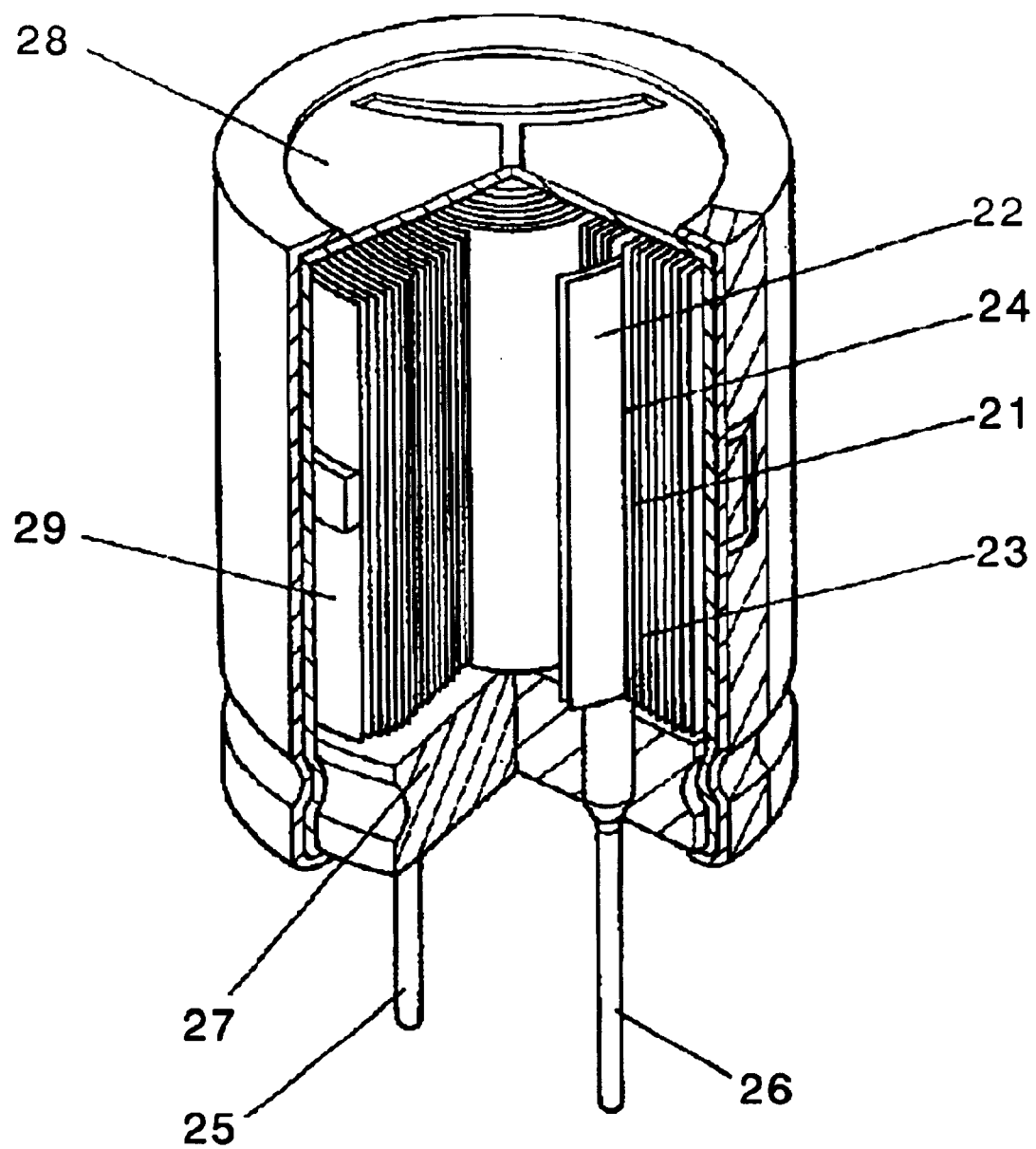
FIG. 3 is a partially-sectional perspective view of a conventional electrolytic capacitor.

FIG. 1 is a partially cut-off front elevation of an electrolytic capacitor in accordance with an exemplary embodiment of the present invention, used to show the structure. FIG. 2 shows the perspective view, partially cut-off. Capacitor element 11 is formed by positive foil 11A and negative foil 11C opposing to each other, which are wound together with intervening separator 11S. Positive foil 11A is an aluminum foil, the effective surface area of foil 11A is enlarged through etching process and the surface is provided with a dielectric oxide film formed through anode oxidation process. It is provided with positive lead 12. Negative foil 11C is also formed of an etched aluminum foil, and provided with negative lead 13.

Capacitor element 11 is impregnated with a liquid which forms an ionic conductive polymeric electrolyte composite (hereinafter referred to as electrolyte composite) 14. The element is inserted in metal case 16 made of aluminum, and the opening of the metal case is closed with sealing plate 15.

When metal case 16 is heated, electrolyte composite 14 is formed within the inside and the outer surface of capacitor element 11, and on the inner surface of metal case 16. Capacitor element 11 is thus fixed in the inside of metal case 16 to form a finished electrolytic capacitor. Metal case 16 is covered with covering resin 17.

The liquid for forming electrolyte composite 14 contains two kinds of acrylic ester monomers and a polymerization initiator. The acrylic ester monomers cause radical polymerization as the result of heating. Thereby, a matrix of copolymer is formed. The liquid for forming electrolyte composite 14 contains either one or more of inorganic acids, organic acids or salts of the one of the acids as the solute, and the polar solvent. Therefore, the solute and the polar solvent are taken into the crosslinked matrix of copolymer. Electrolyte composite 14 has such a structure. The polymerization initiator is such organic peroxide as, for example, t-butylperoxyacetate, t-butylperoxybenzoate, t-hexylperoxy-2-ethylhexanate, t-hexylperoxybutylate, t-butyl peroxymaleate.

Materials for forming such electrolyte composite 14 are practically described below. A first acrylic ester monomer (first monomer) is an acrylic derivative of at least one among the group of monofunctional monomers having hydroxyl group at the end and one polymeric unsaturated double bond. The first monomer shows a better affinity with solvent than acrylic ester having alkyl group at the end. As a result, the matrix of crosslinked copolymer readily takes in the polar solvent, in which either one or more of inorganic acids, organic acids or salts of the one of the acids is resolved. This leads to a higher ionic conductivity. The following can be used for the first monomer.

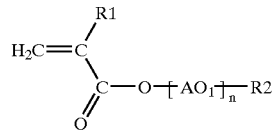
(1)

R1: H or alkyl group having the number of carbons 1–5
AO$_1$: Alkylene oxide group having the number of carbons 2–4
n: Average additional mole number (1–200) of alkylene oxide group having the number of carbons 2–4

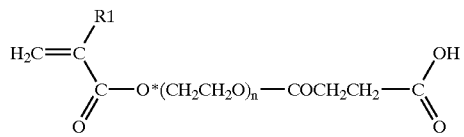
(2)

R1: H or alkyl group having the number of carbons 1–5
n: Average additional mole number (1–200) of alkylene oxide group having the number of carbons 2

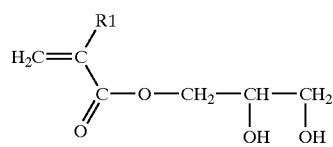
(3)

R1: H or alkyl group having the number of carbons 1–5

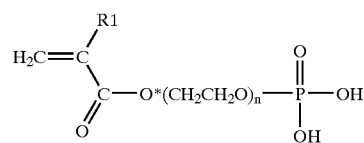
(4)

R1: H or alkyl group having the number of carbons 1–5

A second acrylic ester monomer (second monomer) is an acrylic derivative of at least one among the group of multifunctional monomers having a plurality of polymeric unsaturated double bonds. The second monomer improves the affinity of the matrix of copolymer with the solvent, and the crosslinking density. This increases the quantity for containing the liquid electrolyte. Thus, the ionic conductivity is further increased. Since the matrix of copolymer maintains a certain physical distance between the electrodes, the electrolytic capacitors exhibit a superior anti-short circuiting property. The following can be used for the second monomer.

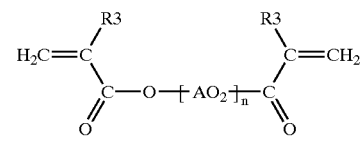
(5)

R3: H or alkyl group having the number of carbons 1–5
AO$_2$: Alkylene oxide group having the number of carbons 2–4
n: Average-additional mole number (1–200) of alkylene oxide group having the number of carbons 2–4

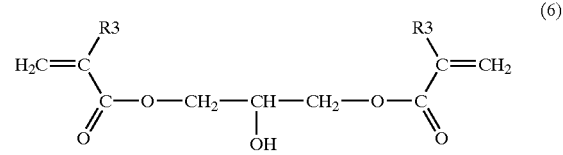
(6)

R3: H or alkyl group having the number of carbons 1–5

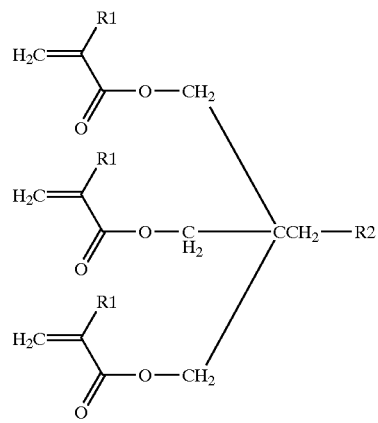
(7)

R1: H or alkyl group having the number of carbons 1–5
R2: H or alkyl group having the number of carbons 1–5
R1 and R2 may either be the same or different to each other.

(8)

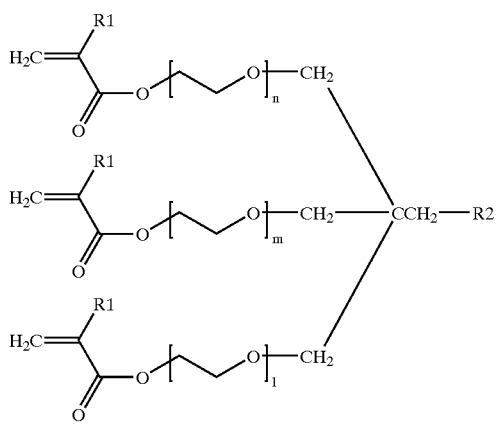

R1, R2: H or alkyl group having the number of carbons 1–5 R1 and R2 may either be the same or different to each other.

l, m, n: Average additional mole number (1–200) of alkylene oxide group having the number of carbons 2

(9)

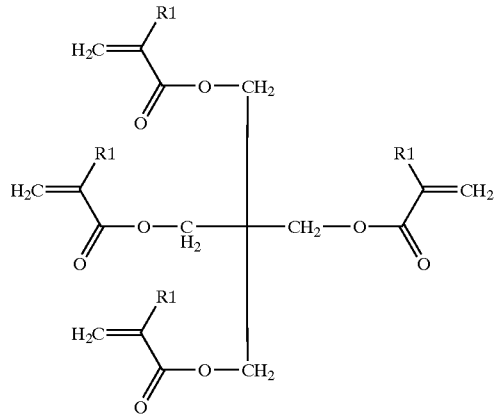

R1: H or alkyl group having the number of carbons 1–5

(10)

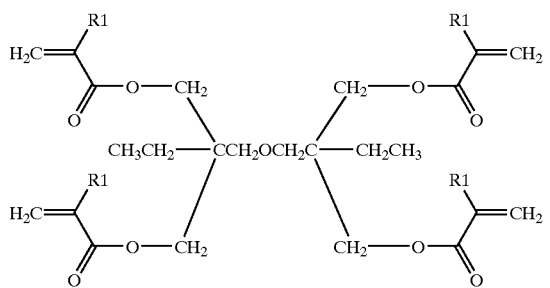

R1: H or alkyl group having the number of carbons 1–5

(11)

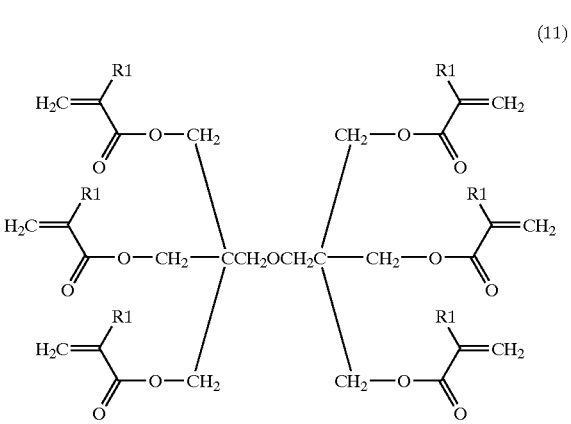

R1: H or alkyl group having the number of carbons 1–5

(12)

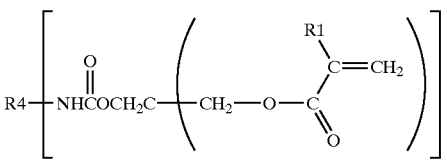

R1: H or alkyl group having the number of carbons 1–5
R4: $-(CH_2)_n-$, $-(C_2H_2O)_n-$,

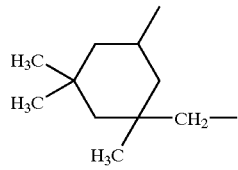

n is a natural number 1–9.

(13)

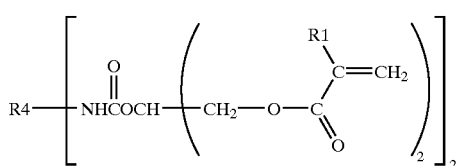

R1: H or alkyl group having the number of carbons 1–5
R4: $-(CH_2)_n-$, $-(C_2H_2O)_n-$,

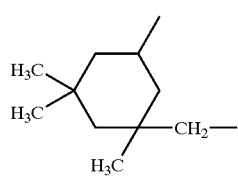

n is a natural number 1–9.

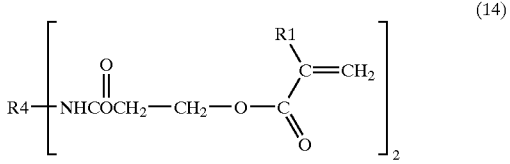
(14)

R1: H or alkyl group having the number of carbons 1–5
R4: —$(CH_2)_n$—, —$(C_2H_2O)_n$—,

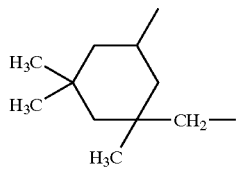

n is a natural number 1–9.

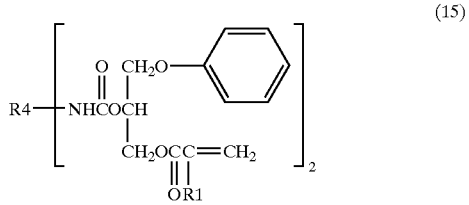
(15)

R1: H or alkyl group having the number of carbons 1–5
R4: —$(CH_2)_n$—, —$(C_2H_2O)_n$—,

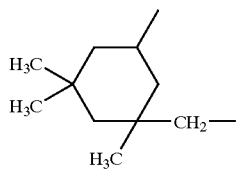

n is a natural number 1–9.

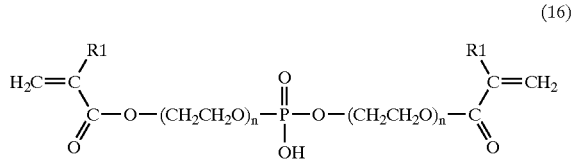
(16)

R1: H or alkyl group having the number of carbons 1–5
n is a natural number 1–9.

The carbons 6 or more numbers with R1, R2 or R3 deteriorates the affinity with solvent. The carbons 5 or more numbers with $AO_1$ deteriorates the affinity with solvent. The average additional mole number 200 or more with l,m or n causes a higher viscosity, which leads to a difficulty of impregnation. The n number 10 or more with R4 causes a higher viscosity, which leads to a difficulty of impregnation.

The following may be used for the polar solvent Ethylene glycol, propylene glycol, 1,4-butanediol, glycerin, polyoxyalkilenepolyol (polyethylene oxide, polypropylene oxide or polyoxyethylene-oxypropylene glycol of which molecular weight is at most 200 and mixture thereof), amide solvent such as N-methylformamide, N,N-dimethylformamide, N-methylacetamideor, N-methylpyrrolidinone, alcohol solvent such as methanol or ethanol, ether solvent such as methylal, 1,2-dimethoxyethane, 1-ethoxy-2-methoxyethane or 1,2-diethoxyethane, nitrile solvent such as acetonitrile or 3-methoxypropionitrile, furan solvent such as 2,5-dimethoxytetrahydrofuran, sulfolane solvent such as sulfolane, 3-methylsulfolane or 2,4-dimethylsulfolane, carbonate solvent such as propylene carbonate, ethylene carbonate, diethyl carbonate, styrene carbonate, dimethyl carbonate or methylethyl carbonate, lactone solvent such as y-butyrolactone, γ-valerolactone, δ-valerolactone, 3-methyl-1,3-oxazolidine-2-one or 3-ethyl-1,3-oxazolidine-2-one, imidazolidinone solvent such as 1,3-dimethyl-2-imidazolidinone, or pyrrolidone solvent.

Each of these may be used by itself alone, or in combination of two or more. Preferred among these are ethylene glycol, propylene glycol, diethylene glycol, water, lactone solvent, alcohol solvent, carbonate solvent, ether solvent, nitrile solvent and furan solvent.

As for the inorganic acid or organic acid, the following may be used:
polycarboxylic acid (bivalent, tervalent or quadrivalent):
aliphatic polycarboxylic acid (saturated polycarboxylic acid) such as oxalic acid, malonic acid, succinic acid, glutaric acid, adipic acid, pimelic acid, suberic acid, azelaic acid, sebacic acid, 1,6-decanedicarboxylic acid, 5,6-decanedicarboxylic acid, 1,7-octanedicarboxylic acid, 7-methyl-7-methoxycarbonyl-1,9-decanedicarboxylic acid, 7,9-dimethyl-7,9-dimethoxycarbonyl-1,11-dodecanedicarboxylic acid, or 7,8-dimethyl-7,8-dimethoxycarbonyl-1,14-tetradecanedicarboxylic acid unsaturated polycarboxylic acid such as maleic acid, fumaric acid or itaconic acid
aromatic polycarboxylic acid such as phthalic acid, isophthalic acid, terephthalic acid, trimellitic acid, or pyromellitic acid
alicyclic polycarboxylic acid such as tetrahydrophthalic acid (cyclohexane-1,2-dicarboxylic acid or the like) or hexahydrophthalic acid alkyl (the number of carbons is 1 to 3) or nitro substitution product of these polycarboxylic acid such as citraconic acid, dimethylmaleic acid, nitrophthalic acid (3-nitrophthalic acid, 4-nitrophthalic acid)
polycarboxylic acid containing sulphur such as thiopropionic acid mono carboxylic acid:
aliphatic monocarboxylic acid (saturated monocarboxylic acid, the number of carbons is 1 to 30 thereof) such as formic acid, acetic acid, propionic acid, butyric acid, isobutyric acid, valeric acid, caproic acid, enanthic acid, caprylic acid, pelargonic acid, lauric acid, myristic acid, stearic acid, behenic acid, malic acid, or tartaric acid
unsaturated monocarboxylic acid such as acrylic acid, mathacrylic acid or oleic acid
aromatic monocarboxylic acid such as benzoic acid, o-nitrobenzoic acid, p-nitrobenzoic acid, cinnamic acid or naphthoic acid
oxycarboxylic acid such as salicylic acid, mandelic acid or resorcylic acid boric acid, phosphoric acid, silicotungstic acid, slicomolybdic acid, phosphomolybdic acid. These and the salts of these can be used as the solute. Among others, 4-fluoboric acid, 6-fluophosphoric acid, perchloric acid, trifluoromethane sulfonic acid and their salts are for electrical double layer capacitors.

In view of the anti-short circuiting property at high voltage, no metal ion is contained in the solute. From the view point of chemical stability, no quaternary ammonium ion is contained in the solute. When quaternary ammonium salt is used, the deterioration induces liquid leakage; thus there is a problem in the safety.

There are salts including carbocation or oninumcation such as sulfonium cation or phosphonium cation. In practice, the solute should preferably be at least one of salts of inorganic and organic acids selected from the group of ammonium salt, primary amine salt, secondary amine salt, tertiary amine salt or amidine salt. These are superior in ionic conductivity, and maintain the stable characteristics even after they are deteriorated.

The amine constituting amine salt includes
primary amine such as methylamine, ethylamine, propylamine, buthylamine, athylenediamine,
secondary amine such as dimethylamine, diethylamine, dipropylamine, methyl-ethylamine, diphenylamine, diethanolamine,
tertiary amine such as trimethylamine, triethylamine, tripropylamine, tridiphenylamine, triethanolamine. As the amidine salt, compound including alkyl-substituted amidine, imidazole compound, benzoimidazole compound or alicyclic amidine compound based on quaternary compound including alkyl-substituted amidine made quaternary by alkyl group or arylalkyl group including 1 to 11 carbons are named.

Describing more practically; quaternary compound including alkyl-substituted amidine:
1-methyl-1,8-diazabicyclo[5,4,0]undec-7-ene-1-methyl-1,5-diazabicyclo[4,3,0]non-5ene-1,2,3-trimethlimidazolium, 1,2,3,4-tetramethyl-imidazolium, 1,2-dimethyl-3-ethl-imidazolium, 1,3-dimethyl-2-heptylimidazolium, 1,3-dimethyl-2-(-3'-heptyl) imidazolium, 1,3-dimethyl-2-dodecyl-imidazolium, 1,2,3-trimethyl-1,4,5,6-tetrahydro-pyrimidium, 1,3-dimethyl-imidazolium, 1-methyl-3-ethyl-imidazolium, 1,3-dimethylbenzo imidazolium are named.

Now, separator 11S is described. A rayon fiber or a cotton linter is used for separator 11S. The rayon fiber is a round fiber of several $\mu$m having fibril net structure. The cotton linter is a short fiber, although it is rather thicker than rayon fiber. Because of such properties, these fibers provide greater surface area than other fibers when skimmed to form a separator sheet; which means that they can contain the electrolyte for more quantities. The ton transmission in electrolyte composite 14 is blocked less, so the resistance loss of the capacitor is small. Since rayon fibers are structured of micro fibers having numerous adhesion points, they are advantageous in terms of anti-short circuiting performance. Electrolytic capacitors using these separators implement a high withstanding voltage, a high thermal resistance, a longer life and a higher operational safety.

Separator 11S may be formed instead with a sheet of rayon fiber or cotton linter containing at least one of cellulose fibers. Or, these may be overlaid to form a separator. The separator made of mixture of those fibers or of overlaid sheets provides a higher fiber-to-fiber density than a sheet of rayon fiber, or cotton linter, alone. This provides a further advantage for the ion transmission in electrolyte composite 14. As to the cellulose fibers, at least one among Manila jute, kraft, hemp and esparto may be used. These can be used in common also for electrolytic capacitors which use liquid electrolyte. So, it offers cost merits.

Still further, separator 11S may be formed instead by overlaying a sheet of rayon fiber, or cotton linter, and a sheet of a cellulose fiber, or the mixture. A separator of the overlaid sheets doesn't block the ion transmission in electrolyte composite 14, and offers an improved anti-short circuiting performance.

Still further, separator 11S may be formed instead by overlaying a sheet of rayon fiber, or cotton linter, containing at least one among Manila jute, kraft, hemp and esparto, and a sheet of at least one of cellulose fibers. A separator of the combination sheets doesn't block the ion transmission in electrolyte composite 14, and offers an improved anti-short circuiting performance.

Still further, separator 11S may be formed instead by overlaying sheets made of one or more kinds of cellulose fibers. A separator formed by overlaying two, or three, low density cellulose sheets exhibits an intense fiber-to-fiber gap that is apparently finer than that of a single sheet of the same basis weight. Since the arrangement of overlaid sheets provides a great number of fine through-holes, the ion transmission in electrolyte composite 14 isn't blocked. So, the capacitors show a reduced resistance loss, and an improved anti-short circuiting performance.

Now in the following, the present embodiment is described more in detail using practical examples.

In the first place, the sample groups 1–3 are described. Positive foil 11A of the samples is made of aluminum foil. The foil is roughened by tunnel-shape pits formed vertically from the surface through DC etching process. And then, a dielectric oxide film (formation voltage 520V) is provided through anode oxidation process. Positive foil 11A thus prepared and negative foil 11C of AC-etched aluminum foil are wound together with intervening separator 11S (50 $\mu$m thick, basis weight 25 g/m$^2$). The basis weight is the product of density by thickness. Capacitor elements 11 are provided in this way. Materials used for separator 11S are 1) rayon fiber 2) cotton linter 3) double sheets of kraft and hemp 4) double sheets of Manila jute and esparto.

Capacitor elements 11 are impregnated with solutions for forming electrolyte composites 14 of sample groups 1–3, as shown in Table 1. The variation of acrylic ester derivative in chemical formula (1) is shown in Table 2, variation of acrylic ester derivative in chemical formula (5) in Table 3. The solution for forming electrolyte composites 14 is adjusted so that the water content is 2 wt %.

Respective capacitor elements 11 are inserted in bottomed cylindrical metal cases 16 made of aluminum. The open end of metal case 16 is sealed with sealing plate 15 of resin-vulcanized butyl rubber, through curling process. Composition of the sealing member is; butyl rubber polymer 30 weight %, carbon 20 weight % and inorganic filler 50 weight %. The hardness is 70 IRHD[international rubber hardness unit]. Capacitor element 11 may be sealed, instead of using metal case 16 and rubber sealing plate 15, with a ceramic, a resin laminate metal foil, etc., in so far as they accomplish the tight sealing.

And then, the sample capacitors are heated at a certain specific temperature to form electrolyte composite 14 in the inside and the outer surface of capacitor elements 11. Capacitor elements 11 are fixed to the inner surface of metal case 16. The sample capacitors of sample groups 1–3 are provided in this way.

Besides the above samples, comparative sample group 1 and comparative sample 2 are prepared for the sake of comparison. Comparative sample group 1 use the same separator as that for sample groups 1–3. Comparative sample 2 uses a Manila paper separator (50 $\mu$m thick, basis weight 25 g/m$^2$). Also shown in Table 1 are composition of solutions to be impregnated in the capacitor elements of comparative sample group 1 and comparative sample 2. The other items regarding the structure and the method of manufacturing remain the same as those for the sample groups 1–3.

TABLE 1

| | Contents of Solution | Composition wt % | Conductivity mS/cm |
|---|---|---|---|
| Sample Group 1 | Ethylene glycol | 78.8 | 2.2 |
| | Ammonium benzoate | 10 | |
| | Formula (1) No. 1 of Table 2 | 10 | |
| | Formula (5) No. 11 of Table 3 | 1 | |
| | Polymerization initiator | 0.2 | |

TABLE 1-continued

|  | Contents of Solution | Composition wt % | Conductivity mS/cm |
|---|---|---|---|
| Sample Group 2 | Ethylene glycol | 72.8 | 2.0 |
|  | Ammonium benzoate | 10 |  |
|  | Formula (1) No. 3 of Table 2 | 12 |  |
|  | Formula (5) No. 12 of Table 3 | 5 |  |
|  | Polymerization initiator | 0.2 |  |
| Sample Group 3 | Ethylene glycol | 59.8 | 3.2 |
|  | Ammonium benzoate | 10 |  |
|  | Formula (2) R1: $C_2H_5$ n = 1 | 20 |  |
|  | Formula (6) R3: $CH_3$ | 10 |  |
|  | Polymerization initiator | 0.2 |  |
| Comparative Sample Group 1 | Ethylene glycol | 75 | 2.3 |
|  | Ammonium azelate | 10 |  |
|  | Alkylcellulose | 15 |  |
| Comparative Sample 2 | Ethylene glycol | 77.8 | 2.8 |
|  | Ammonium adipate | 10 |  |
|  | Formula (1) No. 9 of Table 2 | 10 |  |
|  | Formula (5) No. 13 of Table 3 | 2 |  |
|  | Polymerization initiator | 0.2 |  |

TABLE 2

AO 1

| No. | R1 | Species (Added mol no.) Conformation | Molecular Weight |
|---|---|---|---|
| 1 | $CH_3$— | EO (1.0) | 130 |
| 2 | $CH_3$— | EO (2.0) | 174 |
| 3 | $CH_3$— | EO (4.5) | 284 |
| 4 | H— | EO/PO (3.5/2.5) random | 363 |
| 5 | $CH_3$— | EO (8.0) | 438 |
| 6 | $CH_3$— | EO/TMO (8.4/2.7) random | 600 |
| 7 | $CH_3(CH_2)_2$— | EO/PO (14.8/6.0) block | 1100 |
| 8 | $CH_3$— | EO/PO (85.2/15.5) random | 4700 |
| 9 | $CH_3$— | PO (8.0) | 550 |

TABLE 3

AO2

| No. | R3 | Species (Added mol no.) Conformation | Molecular Weight |
|---|---|---|---|
| 10 | $CH_3$— | EO (2) | 242 |
| 11 | $CH_3$— | EO (4) | 330 |
| 12 | $CH_3$— | EO (9) | 466 |
| 13 | $C_3H_7$— | EO/PO (51.1/10.4) random | 3000 |
| 14 | H— | EO/PO (11.9/16.8) block | 1700 |
| 15 | $CH_3$— | EO (13) | 726 |
| 16 | $C_2H_5$— | EO/PO (14.6/6.0) random | 1000 |

EO: Ethylene oxide
PO: Propylene oxide
TMO: Tetramethylene oxide

Sample electrolytic capacitors are manufactured 20 pieces for each of the categories, sample groups 1–3, comparative sample group 1 and comparative sample 2. These samples are life-tested, and the test results are shown in Table 4 with respect to the spark voltage of the electrolyte composites. Ratings for each of the sample electrolytic capacitors are 400V, 47 µF; test temperature at the ripple load test is 105° C.

Table 4 indicates that electrical characteristics such as tangent of the loss angle (tan δ) and leak current (LC) of electrolytic capacitors in the sample groups 1–3 are identical to those in comparative sample group 1 and comparative sample 2. However, there is a significant difference regarding the long-time stability of electrolytic capacitors in a high temperature environment. All of the sample capacitors in comparative sample group 1 short-circuit during aging on rated voltage in the normal room temperature; meanwhile, those in comparative sample 2 showed frequent short-circuit troubles during life test. On the other hand, these in the sample groups 1–3 remained to be quite stabile, percentage of change in capacitance (ΔC) are small.

TABLE 4

|  |  | Initial |  | 5000 hr after Ripple Load in 105° C. |  |  |  |
|---|---|---|---|---|---|---|---|
|  | Separator | tanδ % | LC µA | ΔC % | tanδ % | LC µA | Sparking Voltage V |
| Sample Group 1 | 1 | 4.3 | 28 | −0.9 | 6.7 | 13 | 480 |
|  | 2 | 4.1 | 24 | −0.7 | 6.4 | 10 |  |
|  | 3 | 4.1 | 26 | −0.8 | 6.6 | 12 |  |
|  | 4 | 4.2 | 25 | −0.8 | 6.5 | 11 |  |
| Sample Group 2 | 1 | 4.3 | 23 | −0.5 | 6.6 | 12 | 460 |
|  | 2 | 4.2 | 22 | −0.8 | 6.2 | 10 |  |
|  | 3 | 4.3 | 23 | −0.8 | 6.3 | 11 |  |
|  | 4 | 4.3 | 24 | −0.7 | 6.4 | 11 |  |
| Sample Group 3 | 1 | 4.1 | 25 | −0.4 | 6.8 | 14 | 500 |
|  | 2 | 4.0 | 22 | −0.3 | 6.3 | 11 |  |
|  | 3 | 4.1 | 24 | −0.4 | 6.6 | 12 |  |
|  | 4 | 4.1 | 23 | −0.5 | 6.5 | 12 |  |
| Comparative Sample Group 1 | 1 | All short-circuited during aging |  |  |  |  | 430 |
|  | 2 | All short-circuited during aging |  |  |  |  |  |
|  | 3 | All short-circuited during aging |  |  |  |  |  |
|  | 4 | All short-circuited during aging |  |  |  |  |  |
| Comparative Sample 2 | Manila paper | 3.9 | 32 | Test terminated due to frequent short-circuiting |  |  | 420 |

From the comparison of sample groups 1–3 with comparative sample group 1, it is known that electrolyte composite 14 formed of the matrix of acrylic ester copolymer offers an improved high temperature stability. The comparison of sample groups 1–3 with comparative sample 2 tells that it is essential to form electrolyte composite 14 with the matrix of acrylic ester copolymer and to select appropriate materials for the separator. Namely, by using rayon fiber, cotton linter, or by using sheets of cellulose fibers overlaid, for the separator 11S, the above advantages can be implemented.

Now, samples 4–7 are described. Positive foil 11A for the samples is also made of aluminum foil. After the surface roughening through AC etching, dielectric oxide film (formation voltage 90V) is provided through anode oxidation process. Positive foil 11A thus prepared and negative foil 11C of AC-etched aluminum foil are wound together with an intervening separator (50 µm thick, basis weight 25 g/m²) made of rayon fiber and hemp mixed. Capacitor element 11 is manufactured in this way. The electrolytic capacitors are provided in the same way as in sample groups 1–3. For the sake of comparison, comparative sample 3 is prepared. The comparative sample 3 uses a hemp paper (50 µm thick, basis weight 25 g/m²). Compositions of the solutions for forming electrolyte composites 14 for samples 4–7 and comparative sample 3 are shown in Table 5.

TABLE 5

|  | Contents of Solution | Composition wt % | Conductivity mS/cm |
|---|---|---|---|
| Sample 4 | Ethylene glycol | 79.8 | 3.2 |
|  | Ammonium adipate | 5 |  |
|  | Formula (1) No. 3 of Table 2 | 10 |  |
|  | Formula (5) No. 13 of Table 3 | 5 |  |
|  | Polymerization initiator | 0.2 |  |
| Sample 5 | γ-butyrolactone | 84.8 | 5.0 |
|  | 1,2,3,4-tetramethyl- | 10 |  |

TABLE 5-continued

|  | Contents of Solution | Composition wt % | Conductivity mS/cm |
|---|---|---|---|
|  | imidazolium phthalate |  |  |
|  | Formula (1) No. 4 of Table 2 | 2 |  |
|  | Formula (5) No. 11 of Table 3 | 3 |  |
|  | Polymerization initiator | 0.2 |  |
| Sample 6 | γ-butyrolactone | 74.8 | 4.9 |
|  | Methyldiethyamine hydrogen maleate | 10 |  |
|  | Formula (1) No. 9 of Table 2 | 5 |  |
|  | Formula (5) No. 15 of Table 3 | 10 |  |
|  | Polymerization initiator | 0.2 |  |
| Sample 7 | Ethylene glycol | 74.8 | 3.0 |
|  | Diethlmethylamine adipate | 10 |  |
|  | Formula (2) R1: $CH_3$ n = 4 | 5 |  |
|  | Formula (6) R3: $C_2H_5$ | 10 |  |
|  | Polymerization initiator | 0.2 |  |
| Comparative Sample 3 | γ-butyrolactone | 70 | 3.0 |
|  | Dimethylethylamine phthalate | 10 |  |
|  | β-1,3-glucan | 10 |  |
|  | Alkylcellulose | 10 |  |

Sample electrolytic capacitors are manufactured for 20 pieces each. Results of life test and spark voltage of electrolyte composites are shown in Table 6. Ratings for each of the sample capacitors are 63V, 330 μF; test temperature at the DC load test is 125° C.

TABLE 6

|  | Initial | | 5000 hr after DC Load in 125° C. | | | Sparking Voltage V |
|---|---|---|---|---|---|---|
|  | tanδ % | LC μA | ΔC % | tanδ % | LC μA | Appearance |
| Sample 4 | 3.7 | 37 | −0.3 | 7.0 | 12 | no problem | 250 |
| Sample 5 | 2.9 | 35 | −0.6 | 6.3 | 14 | no problem | 70 |
| Sample 6 | 2.8 | 35 | −0.4 | 6.4 | 18 | no problem | 70 |
| Sample 7 | 3.4 | 33 | −0.7 | 6.6 | 11 | no problem | 180 |
| Comparative Sample 3 | 15.0 | 45 |  | Wide fluctuation in the characteristics | | | 70 |

Table 6 tells that the electrical characteristics of electrolytes in samples 4–7 are identical to those of comparative sample 3. However, there is a significant difference regarding the long-time stability of electrolytic capacitors in high temperature. Comparative sample 3 showed wide fluctuation in the characteristics during life test, whereas samples 4–7 stayed quite stable.

Thus, a sheet of rayon fiber containing at least one kind of cellulose fiber may be used for separator 11S. Cotton linter may be used in place of the rayon fiber for the same advantages.

Next, sample groups 8–11 are described. Capacitor elements 11 in these samples remain the same as those in sample groups 1–3, with the exception in separator 11S. In sample group 8, cotton linters of different basis weights are used as separator 11S. In sample 9, mixtures of rayon fiber and Manila paper having different basis weights are used. In sample 10, mixtures of cotton linter and kraft paper having different basis weights are used. In sample group 11, various combinations of rayon fiber, cotton linter, Manil jute, kraft, hemp and esparto are used as separator 11S, as shown in Table 9, each one of the combinations having the same basis weight. For the sake of comparison, comparative sample 4 is prepared. Comparative sample 4 uses a sheet of rayon fiber (basis weight 22.5 g/m²) as a separator. Using the above capacitor elements 11, the sample electrolytic capacitors are manufactured in the same way as sample groups 1–3. Compositions of the solutions for forming electrolyte composites 14 in sample groups 8–11 and comparative sample 4 are shown in Table 7.

TABLE 7

|  | Contents of Solution | Composition wt % | Conductivity mS/cm |
|---|---|---|---|
| Sample Group 8 | Ethylene glycol | 59.8 | 3.2 |
|  | Ammonium benzoate | 10 |  |
|  | Formula (2) R1: $CH_3$ n = 4 | 20 |  |
|  | Formula (6) R3: $C_2H_5$ | 10 |  |
|  | Polymerization initiator | 0.2 |  |
| Sample Group 9 | Ethylene glycol | 75.8 | 1.8 |
|  | Ammonium 1,7-octanedicarboxylate | 10 |  |
|  | Formula (2) R1: $C_2H_5$ n = 3 | 12 |  |
|  | Formula (9) R1: H | 2 |  |
|  | Polymerization initiator | 0.2 |  |
| Sample Group 10 | Ethylene glycol | 83.8 | 2.8 |
|  | Ammonium azelate | 10 |  |
|  | Formula (1) No. 1 of Table 2 | 5 |  |
|  | Formula (6) | 1 |  |
|  | Polymerization initiator | 0.2 |  |
| Sample Group 11 | Ethylene glycol | 75.8 | 2.0 |
|  | Ammonium 1,7-octanedicarboxylate | 10 |  |
|  | Formula (1) No. 1 of Table 2 | 12 |  |
|  | Formula (5) No. 12 of Table 3 | 2 |  |
|  | Polymerization initiator | 0.2 |  |
| Comparative Sample 4 | Ethylene glycol | 75 | 2.3 |
|  | Ammonium azelate | 10 |  |
|  | Alkylcellulos | 15 |  |

Sample electrolytic capacitors are manufactured for 20 pieces each. Results of the life test are shown in Tables 8 and 9. Ratings for each of the sample electrolytic capacitors are 400V, 330 μF; test temperature at the DC load test is 125° C. The electrolyte sparking voltages in sample groups 8, 9, 10, 11, and comparative sample 4 are 500V, 500V, 450V, 510V and 430V, respectively.

TABLE 8

|  | Separator | Basis Weight g/m² | Initial | | 5000 hr after DC Load in 125° C. | | |
|---|---|---|---|---|---|---|---|
|  |  |  | tanδ % | LC μA | ΔC % | tanδ % | LC μA | Appearance |
| Sample Group 8 | Cotton Linter | 70.0 | 21.0 | 24 | −0.8 | 32.2 | 9 | too much tanδ |
|  |  | 55.0 | 10.5 | 26 | −0.6 | 17.0 | 10 | no problem |
|  |  | 30.0 | 4.1 | 29 | −0.8 | 7.1 | 9 | no problem |
|  |  | 4.5 | 3.6 | 31 | −0.7 | 5.3 | 8 | no problem |
|  |  | 0.6 | 2.1 | 35 | −0.8 | 3.6 | 7 | no problem |
|  |  | 0.01 | 1.7 | 38 | −0.8 | 2.1 | 6 | no problem |

TABLE 8-continued

| | Separator | Basis Weight g/m² | Initial tanδ % | Initial LC μA | ΔC % | 5000 hr after DC Load in 125° C. tanδ % | 5000 hr after DC Load in 125° C. LC μA | Appearance |
|---|---|---|---|---|---|---|---|---|
| | | 0.005 | 1.4 | 38 | All short-circuited | | | |
| Sample Group 9 | Mixed sheet of Rayon and Manila | 55.0 | 9.2 | 25 | −0.7 | 16.6 | 11 | no problem |
| | | 30.0 | 4.0 | 27 | −0.8 | 6.9 | 8 | no problem |
| | | 1.0 | 2.8 | 29 | −0.7 | 3.2 | 7 | no problem |
| | | 0.01 | 1.9 | 32 | −0.6 | 1.9 | 6 | no problem |
| Sample Group 10 | Mixed sheet of Cotton Linter and Kraft | 55.0 | 9.7 | 27 | −0.8 | 16.9 | 12 | no problem |
| | | 30.0 | 3.8 | 29 | −0.7 | 7.0 | 10 | no problem |
| | | 1.0 | 2.7 | 32 | −0.6 | 4.8 | 9 | no problem |
| | | 0.01 | 1.8 | 33 | −0.6 | 2.0 | 8 | no problem |

TABLE 9

| | Separator | Basis Weight g/m² | Initial tanδ % | Initial LC μA | ΔC % | 5000 hr after DC Load in 125° C. tanδ % | 5000 hr after DC Load in 125° C. LC μA | Appearance |
|---|---|---|---|---|---|---|---|---|
| Sample Group 11 | Double sheet of Rayon, and mixture of Kraft and Hemp | 22.5 | 4.5 | 27 | −0.6 | 7.2 | 9 | no problem |
| | Double sheet of mixture of Rayon and Kraft, and Esparto | 22.5 | 4.4 | 26 | −0.7 | 15.8 | 8 | no problem |
| | Double sheet of Rayon, and mixture of Hemp and Esparto | 22.5 | 4.1 | 25 | −0.6 | 16.3 | 8 | no problem |
| | Double sheet of mixture of Rayon and Hemp, and Manila | 22.5 | 4.2 | 24 | −0.6 | 16.3 | 8 | no problem |
| | Triple sheet of Rayon, and Kraft, and Hemp | 22.5 | 4. | 25 | −0.6 | 16.3 | 8 | no problem |
| | Double sheet of Cotton Linter, and mixture of Kraft and Hemp | 22.5 | 4.2 | 22 | −0.6 | 15.6 | 7 | no problem |
| | Double sheet of mixture of Cotton Linter and Kraft, and Esparto | 22.5 | 4.1 | 25 | −0.7 | 16.0 | 8 | no problem |
| | Double sheet of Cotton Linter, and mixture of Hemp and Esparto | 22.5 | 4.3 | 26 | −0.5 | 16.2 | 8 | no problem |
| | Double sheet of mixture of Cotton Linter and Hemp, and Kraft | 22.5 | 4.2 | 25 | −0.7 | 15.9 | 7 | no problem |
| | Double sheet of Manila, and Kraft | 22.5 | 4.3 | 23 | −0.6 | 15.6 | 8 | no problem |
| | Triple sheet of Manila, Kraft, and Hemp | 22.5 | 4.1 | 24 | −0.8 | 15.3 | 7 | no problem |
| | Double sheet of mixture of Manila and Kraft, and Hemp | 22.5 | 4.2 | 23 | −0.6 | 15.5 | 8 | no problem |
| | Double sheet of mixture of Kraft and Hemp, and Esparto | 22.5 | 4.2 | 25 | −0.7 | 15.4 | 8 | no problem |
| | Double sheet of Rayon, and mixture of Kraft and Hemp (reinforced) | 22.5 | 4.0 | 23 | −0.5 | 14.8 | 6 | no problem |
| | Double sheet of mixture of Manila and Kraft, and Hemp (reinforced) | 22.5 | 4.0 | 21 | −0.4 | 14.3 | 6 | no problem |
| | Kraft paper | 22.5 | 4.7 | 27 | Wide fluctuation in the characteristics | | | |
| Comparative Sample 4 | Rayon fiber sheet | 22.5 | 8.0 | 30 | All short-circuited | | | |

As Table 8 indicates, among the electrolytic capacitors in sample group 8 using cotton linter separators of different basis weights, those whose basis weight of separator is more than 55 g/m² exhibit too high tan δ after DC load test; those at most 55 g/m² do not show any problem in the characteristics of finished product, nor in the appearance. Those less than 0.01 g/m² totally cause short-circuiting.

As described in the above, the basis weight of separator 11S should preferably be at least 0.01 g/m² at most 55 g/m². When such a separator of low basis weight is used, conventional liquid electrolyte or polymer electrolyte readily induces the short-circuiting trouble, and unable to maintain the characteristics in a stable state. When electrolyte composite 14 is employed, the separator is provided with the matrix of polymer in a network arrangement. This maintains the physical distance between the electrodes to ensure an improved withstanding voltage. Therefore, the separators of low basis weight, which has not used to be applicable to medium- and high-voltage capacitors, can now be usable for such capacitors. Since use of such separators substantially lowers the share of a separator among the resistance factors within an electrolytic capacitor, both the ESR and impedance can be significantly reduced.

The mixed sheet of rayon fiber, or cotton linter, and cellulose fiber, exemplified in sample group 9 and sample group 10, do not cause any problem in the characteristics, nor in the appearance.

Referring to Table 9, among those capacitors of sample group 11 in which different kinds of separators each having the same basis weight are used, only the sample capacitor using the single-sheet kraft paper separator exhibits a wide shift in the characteristics during the test. Sample with other separators do not show any problem, nor in the product appearance.

On the other hand, as comparative sample 4 indicates, those that do not use the acrylic ester polymer electrolyte composite totally cause short-circuiting trouble, despite the use of rayon fiber for separators.

As described above, electrolytic capacitors in accordance with the present exemplary embodiment include the above-described electrolyte composite 14. They are provided with the separator formed of rayon fiber or cotton linter, or double or triple sheets of a cellulose fiber, or a mixture of these. These electrolytic capacitors offer an improved high temperature life characteristic. They can be supplied on a stable basis of production.

Some of those in sample group 11 are provided in the sheet of separator 11S with a reinforcement processing. Practically, separators 11S is reinforced by an agent as such: a polyacrylamide polymer, a polyvinyl alcohol polymer, cationic starch, urea, formalin resin, melamine-formalin resin, the result, separator 11S is strengthened in the tensile strength, which enables to use a separator sheet of lower basis weight. Therefore, the ESR and impedance of a capacitor can be further lowered.

In the present embodiment, positive foil 11A is provided with tunnel pits dug from the surface in the direction of depth. This contributes to raise the capacitance generation rate of positive foil 11A.

Electrolytic capacitors in the present invention offer a high withstanding voltage, a high heat resisting property, and a high reliability as well as operational safety in terms of operating life time, anti-vibration capability, etc. They are used in new application in the sectors of anti-higher harmonics circuits and vehicles, among other fields.

What is claimed is:

1. An electrolytic capacitor comprising:
   a positive foil provided at the surface with a dielectric coating;
   a negative foil opposing to the positive foil;
   a separator containing at least either one of rayon fiber and cotton linter, disposed between the positive foil and the negative foil; and
   a polymeric electrolyte composite conducting an ion between the positive foil and the negative foil, the polymeric electrolyte composite including;
      an electrolyte formed of a polar solvent and at least one among inorganic acids, organic acids and salts of the inorganic, organic acids containing neither metal ion nor quaternary ammonium ion as a cation,
      an acrylic ester copolymer containing the electrolyte, the copolymer made of;
         a first monomer of acrylic derivative formed of at least one among the group of monofunctional monomers having hydroxyl group at the end and one polymeric unsaturated double bond, and
         a second monomer of acrylic derivative formed of at least one among the group of multifunctional monomers having a plurality of polymeric unsaturated double bond.

2. The electrolytic capacitor of claim 1, wherein the separator further includes a cellulose fiber.

3. The electrolytic capacitor of claim 2, wherein the cellulose fiber includes at least one among the group of Manila jute, kraft, hemp and esparto.

4. The electrolytic capacitor of claim 2, wherein the separator is formed of a mixture of at least either one of the rayon fiber and cotton linter, and the cellulose fiber.

5. The electrolytic capacitor of claim 1, wherein the separator is made of a plurality of sheets overlaid, at least either one of the plurality of sheets is sheet (A) which contains at least either one of the rayon fiber and the cotton linter.

6. The electrolytic capacitor of claim 5, wherein each of the plurality of sheets contains at least either one of the rayon fiber and the cotton linter.

7. The electrolytic capacitor of claim 5, wherein at least any one of the plurality of sheets other than the sheet (A) is formed of a cellulose fiber.

8. An electrolytic capacitor comprising:
   a positive foil provided at the surface with a dielectric coating;
   a negative foil opposing to the positive foil;
   a separator made of a plurality of overlaid sheets each formed of a cellulose fiber, disposed between the positive foil and the negative foil; and
   a polymeric electrolyte composite conducting an ion between the positive foil and the negative foil, the polymeric electrolyte composite including;
      an electrolyte formed of a polar solvent and at least one among inorganic acids, organic acids and salts of the inorganic, organic acids containing neither metal ion nor quaternary ammonium ion as a cation,
      an acrylic ester copolymer containing the electrolyte, the copolymer made of;
         a first monomer of acrylic derivative formed of at least one among the group of monofunctional monomers having hydroxyl group at the end and one polymeric unsaturated double bond, and
         a second monomer of acrylic derivative formed of at least one among the group of multifunctional monomers having a plurality of polymeric unsaturated double bond.

9. The electrolytic capacitor of claim 1, wherein the basis weight of the separator is at least 0.01 g/m$^2$, at most 55 g/m$^2$.

10. The electrolytic capacitor of claim 8, wherein the basis weight of the separator is at least 0.01 g/m$^2$, at most 55 g/m$^2$.

11. The electrolytic capacitor of claim 9, wherein the separator is provided with a reinforcement processing.

12. The electrolytic capacitor of claim 10, wherein the separator is provided with a reinforcement processing.

13. The electrolytic capacitor of claim 1, wherein the solute is at least one selected from the group of ammonium salt, primary amine salt, secondary amine salt, tertiary amine salt and amidine salt.

14. The electrolytic capacitor of claim 8, wherein the solute is at least one selected from the group of ammonium salt, primary amine salt, secondary amine salt, tertiary amine salt and amidine salt.

15. The electrolytic capacitor of claim 1, wherein the positive foil is provided with tunnel-like pits stretching from the surface in the depth direction.

16. The electrolytic capacitor of claim 8, wherein the positive foil is provided with tunnel-like pits stretching from the surface in the depth direction.

* * * * *